US008345072B2

(12) United States Patent
Kurokawa et al.

(10) Patent No.: US 8,345,072 B2
(45) **Date of Patent: *Jan. 1, 2013**

(54) DISPLAY SYSTEM

(75) Inventors: Yoshiki Kurokawa, Tokyo (JP); Yasuyuki Kudo, Tokyo (JP); Hiroyuki Nitta, Fujisawa (JP); Kazuki Homma, Kodaira (JP); Junya Takeda, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,315

(22) Filed: Mar. 19, 2012

(65) Prior Publication Data

US 2012/0176400 A1 Jul. 12, 2012

Related U.S. Application Data

(63) Continuation of application No. 12/468,345, filed on May 19, 2009, now Pat. No. 8,154,560.

(30) Foreign Application Priority Data

Sep. 29, 2008 (JP) ................................ 2008-249427

(51) Int. Cl.

| | |
|---|---|
| ***G09G 5/00*** | (2006.01) |
| ***G09G 5/02*** | (2006.01) |
| ***G06T 1/00*** | (2006.01) |
| ***G06K 9/00*** | (2006.01) |
| ***G06K 9/40*** | (2006.01) |
| ***H04N 1/60*** | (2006.01) |
| ***H04N 1/46*** | (2006.01) |

(52) U.S. Cl. ........ 345/690; 345/581; 345/606; 345/204; 348/557; 348/791; 348/807; 358/519; 358/523; 358/525; 382/162; 382/166; 382/254; 382/274

(58) Field of Classification Search .................. 345/581, 345/589–594, 597, 600–606, 204, 690, 549; 358/515–525; 382/162–167, 254, 274
See application file for complete search history.

(56) References Cited

U.S. PATENT DOCUMENTS 5,185,661 A * 2/1993 Ng ................................ 358/505

(Continued)

FOREIGN PATENT DOCUMENTS

JP 2004-96731 A 3/2004

(Continued)

OTHER PUBLICATIONS

JP Office Action in JP Application No. 2008-249427, dated Oct. 11, 2012.

*Primary Examiner* — Wesner Sajous
(74) *Attorney, Agent, or Firm* — Mattingly & Malur, PC

(57) ABSTRACT

A display drive circuit of the invention has: an initial-color-gamut-apex-coordinate-storing unit capable of storing initial color gamut apex coordinates; a user-target-color-gamut-apex-coordinate-storing unit capable of storing user target color gamut apex coordinates; a saturation-expansion-coefficient-deciding unit for deciding expansion coefficients of saturation data based on the initial and user target color gamut apex coordinates; and an expansion unit for expanding saturations of display data based on the saturation expansion coefficients. The expansion coefficients of saturation data are decided based on the initial and user target color gamut apex coordinates, and saturations of display data are expanded according to the expansion coefficients. Thus, the degree of expanding the saturations can be controlled for each color gamut or each of R, G and B color properties of an LC display panel.

11 Claims, 7 Drawing Sheets

U.S. PATENT DOCUMENTS

| | | | | |
|---|---|---|---|---|
| 5,982,925 | A | 11/1999 | Koizumi et al. | |
| 5,982,928 | A * | 11/1999 | Shimada et al. | 382/187 |
| 6,373,595 | B1 * | 4/2002 | Semba et al. | 358/1.9 |
| 2002/0041393 | A1 * | 4/2002 | Takahashi et al. | 358/1.15 |
| 2003/0165266 | A1 * | 9/2003 | Kagawa et al. | 382/166 |
| 2006/0120598 | A1 * | 6/2006 | Takahashi et al. | 382/167 |
| 2006/0285136 | A1 | 12/2006 | Shin et al. | |
| 2008/0013114 | A1 * | 1/2008 | Hasegawa et al. | 358/1.6 |
| 2008/0089604 | A1 | 4/2008 | Kim et al. | |
| 2009/0002783 | A1 * | 1/2009 | Hashii et al. | 358/520 |
| 2010/0157154 | A1 * | 6/2010 | Kobayashi et al. | 348/557 |

FOREIGN PATENT DOCUMENTS

| | | | |
|---|---|---|---|
| JP | 3749722 | B2 | 12/2005 |
| JP | 2008104177 | | 5/2008 |
| KR | 2006-0133713 | A | 12/2006 |

* cited by examiner

DISPLAY SYSTEM

CROSS-REFERENCE

This application is a continuation application of U.S. Ser. No. 12/468,345, filed May 19, 2009 (now U.S. Pat. No. 8,154,560), the entire contents of which are hereby incorporated by reference.

CLAIM OF PRIORITY

The Present application claims priority from Japanese application JP 2008-249427 filed on Sep. 29, 2008, the content of which is hereby incorporated by reference into this application.

FIELD OF THE INVENTION

The present invention relates to a display drive circuit operable to drive a liquid crystal panel according to entered display data.

BACKGROUND OF THE INVENTION

As an example of display drive circuits, there is an LC drive circuit for driving an LC display. In recent years, e.g. battery-driven information devices and mobile phones are equipped with compact LC displays. Such compact LC displays are strongly required to achieve high definition, low cost, low power consumption, etc. To meet such requirements, measures, including the enhancement of the passband property of a color filter, are taken. A downside of this is that the color purities of primary colors R (Red), G (Green) and B (Blue) are lowered, and thus the range of colors (color gamut) which an LC display panel can express is narrowed. Therefore, compact LC displays tend to decline in its capability of expressing colors.

Under such circumstances, an attempt has been made to emphasize the saturations of data to be displayed on an LC display thereby to widen the apparent color gamut and enhance the capability of expressing colors as much as the LC display panel can express. For example, a technique to solve the problem of color gradation deterioration and the like attributed to the phenomenon that the saturation comes after expansion has been known, which is disclosed by e.g. Japanese Patent No. 3,749,722. Applying the technique to compact LC display panels, the apparent color gamut can be widened thereby to increase the capability of expressing colors as much as the panels can express.

SUMMARY OF THE INVENTION

However, according to the study by the inventor hereof, it is considered to be difficult to correct the degree of expanding a saturation according to the area of the color gamut of a targeted LC display panel by simply applying the technique disclosed by Japanese Patent No. 3,749,722. This is because properties of the used color filter and LC material are different among LC display panels, which applies to the color gamut. Further, even when R, G and B colors have color gamuts of the same area, but as they differ in color properties, it is also considered to be difficult to correct the degree of expanding a saturation according to the color properties by simply applying the technique disclosed by Japanese Patent No. 3,749,722.

Therefore, it is an object of the invention to provide a technique which enables to control the degree of expanding saturation according to each color gamut of an LC display panel or R, G and B color properties.

The above and other objects of the invention and novel features thereof will become clear from the description hereof and the accompanying drawings.

Of the invention herein disclosed, a preferred embodiment will be described below in brief.

That is, the display drive circuit includes: an initial-color-gamut-apex-coordinate-storing unit capable of storing initial color gamut apex coordinates; a user-target-color-gamut-apex-coordinate-storing unit capable of storing user target color gamut apex coordinates; a saturation-expansion-coefficient-deciding unit for deciding expansion coefficients of saturation data based on the initial and user target color gamut apex coordinates; and an expansion unit for expanding saturations of display data based on the saturation expansion coefficients. In the display drive circuit, expansion coefficients of saturation data are decided based on the initial and user target color gamut apex coordinates, and saturations of the display data are expanded according to the expansion coefficients thus decided. Thus, the degree of expanding saturation can be controlled for each color gamut of an LC display panel.

An effect which a preferred embodiment of the invention herein disclosed can achieve is described below in brief.

That is, as to a display drive circuit which can drive an LC display panel in response to entered display data, it is possible to control the degree of expanding saturation according to each color gamut of an LC display panel or R, G and B color properties.

DETAILED DESCRIPTION OF THE PREFERRED EMBODIMENTS

1. Summary of the Preferred Embodiments

Figure 1:
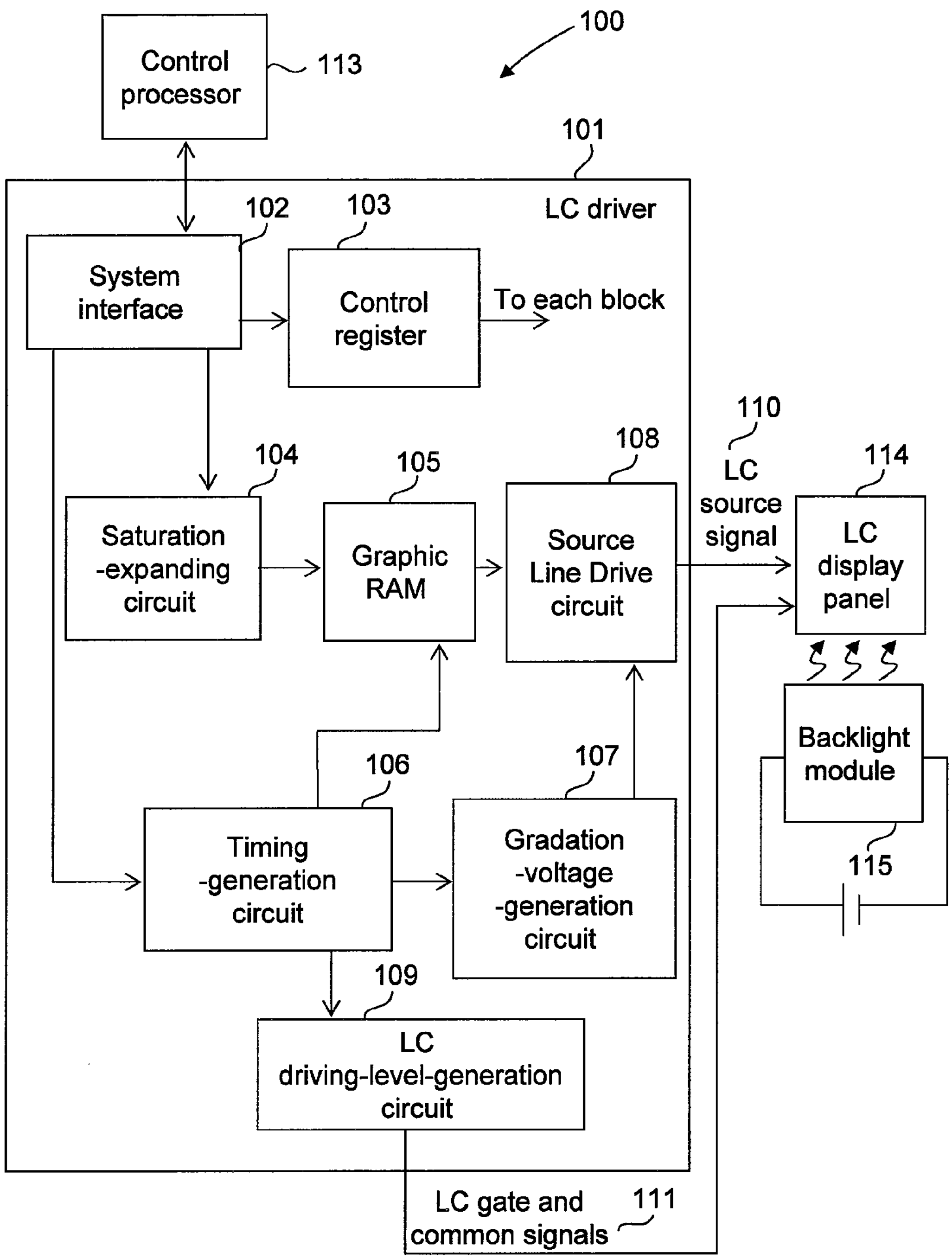
FIG. 1 is a block diagram showing an example of the configuration of an LC driver, which is an exemplary form of a display drive circuit according to the invention.

The preferred embodiment of the invention herein disclosed will be outlined first. The reference numerals to refer to the drawings, which are accompanied with paired round brackets here, only exemplify what the concepts of members or units referred to by the numerals contain.

[1] A display drive circuit (101) according to a preferred embodiment of the invention includes: an initial-color-gamut-apex-coordinate-storing unit (211) capable of storing initial color gamut apex coordinates; a user-target-color-gamut-apex-coordinate-storing unit (212) capable of storing user target color gamut apex coordinates; a saturation-expansion-coefficient-deciding unit (210) for deciding expansion coefficients of saturation data based on the initial and user target color gamut apex coordinates; and an expansion unit (206) for expanding saturations of display data based on the saturation expansion coefficients.

According to the above arrangement, expansion coefficients of saturation data are decided based on the initial and user target color gamut apex coordinates, based on which saturations of the display data are expanded. Therefore, the degree of expanding saturations can be controlled for each color gamut of an LC display panel.

[2] In the display drive circuit described in [1], the saturation-expansion-coefficient-deciding unit can be arranged so as to compute the expansion coefficients based on an area ratio between a color gamut calculated from the initial color gamut apex coordinates and a color gamut calculated from the user target color gamut apex coordinates.

[3] In the display drive circuit described in [1], the saturation-expansion-coefficient-deciding unit can be arranged so as to find a square root of the area ratio between a color gamut calculated from the initial color gamut apex coordinates and a color gamut calculated from the user target color gamut apex coordinates thereby to compute the expansion coefficients.

[4] The display drive circuit may be provided with an interface (102) which enables information setting on the initial-color-gamut-apex-coordinate-storing unit and user-target-color-gamut-apex-coordinate-storing unit from the outside of the display drive circuit.

[5] A display drive circuit (101) according to another embodiment of the invention includes: an initial-color-gamut-apex-coordinate-storing unit (211) capable of storing initial color gamut apex coordinates; a user-target-color-gamut-apex-coordinate-storing unit (212) capable of storing user target color gamut apex coordinates; an RGB saturation-expansion-coefficient-deciding unit (501) for deciding saturation expansion coefficients of R, G and B based on the initial and user target color gamut apex coordinates; a saturation-expansion-coefficient-interpolating unit (503) for performing interpolating calculation of the saturation expansion coefficients of R, G and B; and an expansion unit (206) for expanding saturations of display data based on the saturation expansion coefficients subjected to interpolation by the saturation-expansion-coefficient-interpolating unit.

According to the above arrangement, saturation expansion coefficients of R, G and B are decided based on the initial and user target color gamut apex coordinates, based on which the interpolating calculation of the saturation expansion coefficients of R, G and B is performed. Therefore, the degree of expanding saturations can be controlled according to the properties of R, G and B colors of an LC display panel.

[6] In the display drive circuit described in [5], the RGB saturation-expansion-coefficient-deciding unit can be arranged so as to find distance values of the initial and user target color gamut apex coordinates of R, G and B from a white-color coordinate thereby to determine a ratio of the distance values of the initial and user target color gamut apex coordinates for each of R, G and B, and to calculate a saturation expansion coefficient of each of R, G and B from the ratios.

[7] In the display drive circuit described in [6], the saturation-expansion-coefficient-interpolating unit can be arranged so as to perform linear interpolation on the R, G and B saturation expansion coefficients based on hue data.

[8] The display drive circuit described in [5] can be provided with an interface (102) which enables information setting on the initial-color-gamut-apex-coordinate-storing unit and user-target-color-gamut-apex-coordinate-storing unit from the outside of the display drive circuit.

[9] A display drive circuit (101) according to another embodiment of the invention includes: an RGB saturation-expansion-coefficient-storing unit (1001) capable of storing saturation expansion coefficients of R, G and B; a saturation-expansion-coefficient-interpolating unit (503) for performing interpolating calculation of the saturation expansion coefficients of R, G and B; and an expansion unit (206) for expanding saturations of display data based on the saturation expansion coefficients subjected to interpolation by the saturation-expansion-coefficient-interpolating unit.

According to the above arrangement, saturations of the display data are expanded based on the saturation expansion coefficients subjected to the interpolation by the saturation-expansion-coefficient-interpolating unit. Therefore, the degree of expanding saturations can be controlled according to the properties of R, G and B colors of an LC display panel.

[10] In the display drive circuit described in [9], the saturation-expansion-coefficient-interpolating unit can be arranged so as to perform linear interpolation on the R, G and B saturation expansion coefficients based on hue data.

[11] The display drive circuit described in [9] can be provided with an interface (102) which enables information setting on the RGB saturation-expansion-coefficient-storing unit from the outside of the display drive circuit.

2. Further Detailed Description of the Preferred Embodiments

Now, the embodiments will be described further in detail. It is noted that in all the drawings to which reference is made in describing the embodiments, the members or units having identical functions are identified by the same reference numeral, and the repeated description thereof is omitted herein.

First Embodiment

FIG. 1 shows an LC display device including an LC driver, which is an exemplary form of a display drive circuit according to the invention.

The LC display device 100 shown in FIG. 1 is not particularly limited, but includes an LC driver 101, a control processor 113 and an LC display panel 114. The LC driver 101 drives and controls the LC display panel. The control processor 113 prepares display data, and transmits the data to the LC driver 101. The LC display panel 114 receives an LC source signal 110, and LC gate and common signals 111 from the LC driver 101 and then display an image. The backlight module 115 turns on a backlight to light up the liquid crystal display panel 114 with a desired brightness. Thus, it becomes possible to observe a display on the liquid crystal display panel 114 as visible light.

The LC driver 101 is not particularly limited, but includes a system interface 102, a control register 103, a saturation-expanding circuit 104, a graphic RAM (Random Access Memory) 105, a source line drive circuit 108, a timing-generation circuit 106, a gradation-voltage-generation circuit 107, and an LC driving-level-generation circuit 109. The LC driver 101 is formed on a semiconductor substrate, such as a monocrystalline silicon substrate, by a well-known semiconductor IC manufacturing technique.

The control register 103 is a collection of registers for controlling parts or blocks of the LC driver. The system interface 102 accepts various kinds of data including data to be written into the control register 103 from the outside of the LC driver 101, and then supplies the data to the appropriate internal blocks. On receipt of display data from the system interface 102, the saturation-expanding circuit 104 creates therefrom display data with the saturation expanded, and transfers the display data thus created to the graphic RAM 105. In this step, the expansion is performed according to a saturation-expanding method, which is to be described later. The graphic RAM 105 serves as a buffer for receiving and accumulating the display data sent through the saturation-expanding circuit 104, and passing the display data to the source line drive circuit 108. The timing-generation circuit 106 generates an operation timing for the entire LC driver according to information stored in the control register 103. The gradation-voltage-generation circuit 107 generates a gradation voltage to be used in the source line drive circuit 108. The source line drive circuit 108 uses the display data sent from the graphic RAM 105 to select, of gradation voltages generated by the gradation-voltage-generation circuit 107, a certain voltage, and then output the selected voltage as an LC source signal 110 to the outside. The LC driving-level-generation circuit 109 generates gate and common signals 111, which are used to drive the liquid crystal, and outputs the signals to the outside.

The LC driver 101 arranged as described above works as follows.

The LC driver 101 takes display data from the outside through the system interface 102, then performs expansion of the saturation of the display data, which is to be described later, at the saturation-expanding circuit 104 and accumulates the thus expanded data in the graphic RAM 105. The timing-generation circuit 106 generates a timing signal for reading the graphic RAM, and transmits the display data to the source line drive circuit 108 with the timing. The source line drive circuit selects a voltage from among gradation voltages produced by the gradation-voltage-generation circuit 107 according to the display data, and sends the selected voltage to the LC display panel 114 as an LC source signal 110. On the other hand, the LC driving-level-generation circuit 109 uses a timing signal generated by the timing-generation circuit 106 to prepare LC gate and common signals 111. The LC gate and common signals 111 thus prepared are also sent to the liquid crystal display panel 114.

Figure 2:
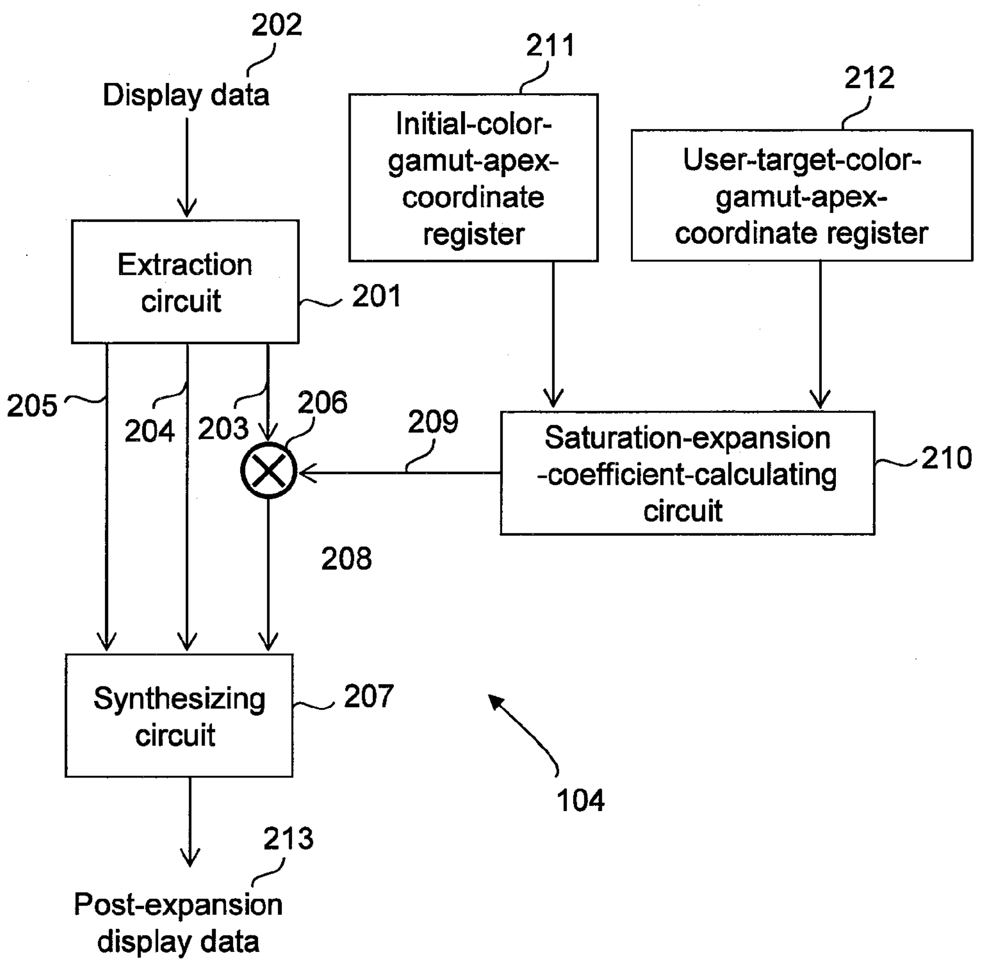
FIG. 2 is a block diagram showing an example of the configuration of a saturation-expanding unit in the LC driver.

FIG. 2 shows an example of the configuration of the saturation-expanding circuit 104.

In the drawing, the reference numeral 201 denotes an extraction circuit; 202 denotes display data; 203 denotes saturation data S; 204 denotes hue data H; 205 denotes lightness data V; 206 denotes a saturation-expanding multiplier, 207 denotes a synthesizing circuit; 208 denotes post-expansion saturation data S'; 209 denotes a saturation expansion coefficient k; 210 denotes a saturation-expansion-coefficient-calculating circuit; 211 denotes an initial-color-gamut-apex-coordinate register; 212 denotes a user-target-color-gamut-apex-coordinate register; and 213 denotes post-expansion display data. In the initial-color-gamut-apex-coordinate register 211, an initial color gamut apex coordinate; in the user-target-color-gamut-apex-coordinate register 212, a user target color gamut apex coordinate are set (see FIG. 3). The initial color gamut apex coordinates and user target color gamut apex coordinates have been stored in a nonvolatile memory (not shown). The setting of coordinate information on the initial-color-gamut-apex-coordinate register 211 and user-target-color-gamut-apex-coordinate register 212 is performed through the system interface 102 each time the LC display device 100 is turned on.

The extraction circuit 201 converts R, G and B values of the display data 202 sent from the system interface 102 to HSV or YCbCr form, and extracts respective parameters. In a case of using HSV, saturation data (S) 203 is calculated according to the Expression 1. Hue data (H) 204, which is indicated by the number no less than 0° and less than 360°, is calculated according to Expression 2, and lightness data (V) 205 is calculated according to the Expression 3. The saturation data (S) 203 are output to the saturation-expanding multiplier 206, and the hue data (H) 204 and lightness data (V) 205 are output to the synthesizing circuit 207.

Now, it is noted that max(R,G,B) is a function of taking a maximum among the parameters in parentheses and min(R,G,B) is a function of taking a minimum among the parameters in parentheses.

$$S=\max(R,G,B)-\min(R,G,B) \quad \text{[Expression 1]}$$

[Expression 2]

$$H=\begin{cases} 60\times((G-B)/\max(R,G,B)-\min(R,G,B))+0 & (\max=R) \\ 60\times((B-R)/\max(R,G,B)-\min(R,G,B))+120 & (\max=G) \\ 60\times((R-G)/\max(R,G,B)-\min(R,G,B))+240 & (\max=B) \end{cases}$$

[Expression 3]

$$V=\max(R,G,B)$$

In the saturation-expanding multiplier 206, a value resulting from normalization of saturation data (S) 203 with a lightness V is substituted into the parameter nS, and multiplied by a saturation expansion coefficient (k) 209 as shown by the following Expression 4:

$$S'=nS\times k(S'\leqq 1.0). \quad \text{[Expression 4]}$$

Then, the result is output to the synthesizing circuit 207 as post-expansion saturation data (S') 208.

The saturation expansion coefficient (k) 209 is output from the saturation-expansion-coefficient-calculating circuit 210. The saturation-expansion-coefficient-calculating circuit 210 calculates a saturation expansion coefficient (k) 209 from an area ratio between an initial color gamut and a user target color gamut depending on the values held by the initial-color-gamut-apex-coordinate register 211 and the user-target-color-gamut-apex-coordinate register 212 by use of a method which is to be described later. The values of the initial-color-gamut-apex-coordinate register 211 and user-target-color-gamut-coordinate register 212 are expressed by x and y coordinates on a chromaticity diagram, and how to set the values in the registers is to be described later.

The synthesizing circuit 207 converts HSV data including the hue data (H) 204 and lightness data (V) 205 output from the extraction circuit 201, and the post-expansion saturation components (S') 208 output from the saturation-expanding multiplier 206 into R, G and B values, and outputs them as post-expansion display data 213, in which the conversion is performed according the procedure as described below.

First, hue data H is divided by 60, and separated into an integer part Hi ranging from 0 to 5 and a decimal part f as shown by the following Expressions 5 and 6. Here, it is noted that in the former expression, a pair of parentheses means a maximum integer value which does not exceed a value in the parentheses.

$$H_i = \left\lfloor \frac{H}{60} \right\rfloor \quad \text{[Expression 5]}$$

$$f = \frac{H}{60} - H_i \quad \text{[Expression 6]}$$

Then, values for conversion to RGB are calculated from the post-expansion saturation data S' and lightness V, as shown by the following Expression 7:

$$p=V(1-S'),$$

$$q=V(1-fS'),$$

$$t=V\leqq(1-(1-f)S'). \quad \text{[Expression 7]}$$

At the end, R, G and B values are determined based on the value of Hi as shown by the following Expression 8:

$$R=V,G=t,B=p(H_i=0),$$

$$R=q,G=V,B=p(H_i=1),$$

$$R=p,G=V,B=t(H_i=2),$$

$$R=p,G=q,B=V(H_i=3),$$

$$R=t,G=p,B=V(H_i=4),$$

$$R=V,G=p,B=q(H_i=5), \quad \text{[Expression 8]}$$

The saturation-expanding circuit 104 works using the blocks as follows.

Using the extraction circuit 201, saturation data (S) 203, hue data (H) 204 and lightness data (V) 205 are extracted from display data 202. The hue data (H) 204 and lightness data (V) 205 are output to the synthesizing circuit 207.

The saturation data (S) 203 is multiplied by a saturation expansion coefficient (k) 209 in the saturation-expanding multiplier 206, and then output to the synthesizing circuit 207 as post-expansion saturation (S') 208. The saturation expansion coefficient (k) 209 is calculated from the values of the initial-color-gamut-apex-coordinate register 211 and user-target-color-gamut-apex-coordinate register 212 in the saturation-expansion-coefficient-calculating circuit 210. The synthesizing circuit 207 converts H, S and V values input thereto into R, G and B values, and then outputs as post-expansion display data 213 to the graphic RAM 105 shown in FIG. 1.

Figure 3:
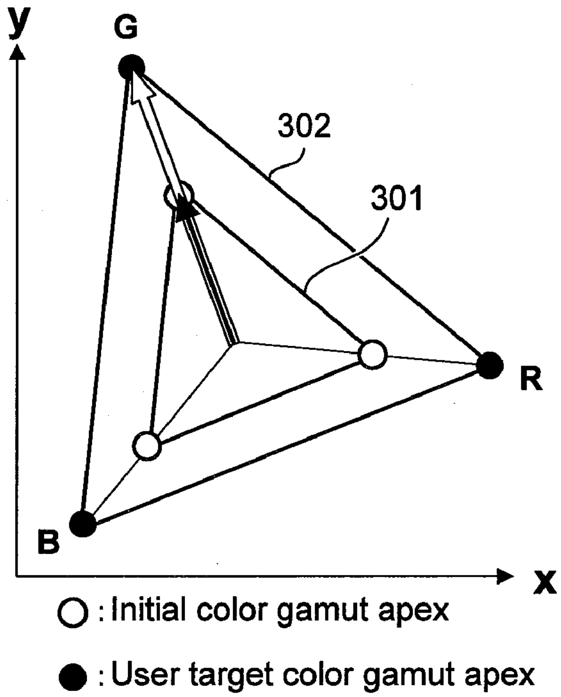
FIG. 3 is an illustration for explaining the way of setting register values in the saturation-expanding unit.

FIG. 3 shows set values in the initial-color-gamut-apex-coordinate register 211 and user-target-color-gamut-apex-coordinate register 212. The reference numeral 301 denotes an initial color gamut, and 302 denotes a user target color gamut. The initial color gamut 301 refers to a color gamut in case that display data are output without performing any processing, and the user target color gamut 302 represents a color gamut targeted by a user. These color gamuts are each presented by a triangle with apexes formed by R, G and B values, as shown in FIG. 3, and their areas can be calculated from the coordinates of the apexes. Coordinates of R, G and B values of the initial color gamut 301 are made set values of the initial-color-gamut-apex-coordinate register 211, whereas coordinates of R, G and B values of the user target color gamut 302 are made set values of the user-target-color-gamut-coordinate register 212.

Figure 4:
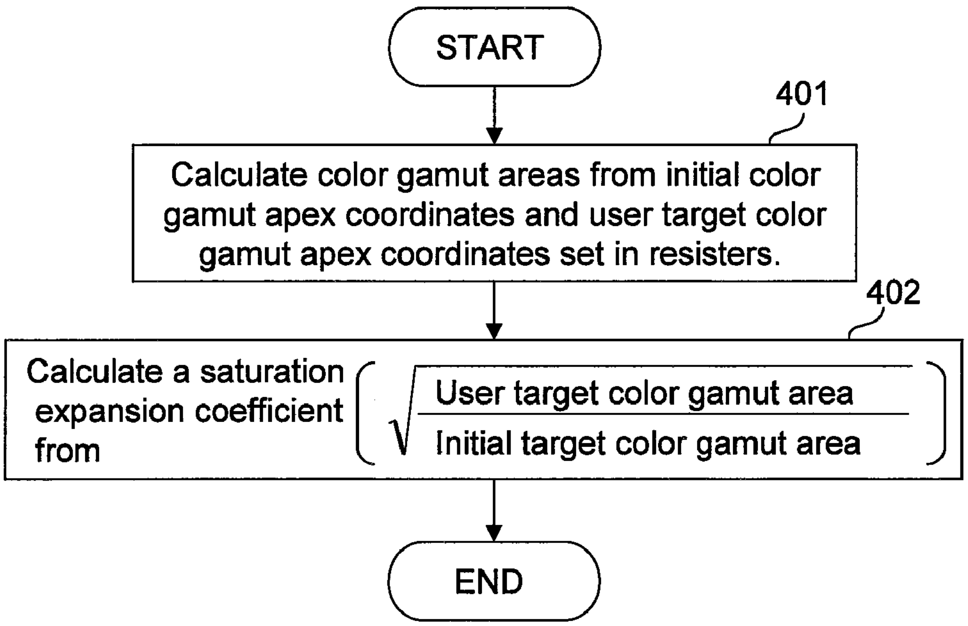
FIG. 4 is a flowchart of the calculation of a saturation expansion coefficient by the saturation-expanding unit.

FIG. 4 shows a flow of the calculation of the saturation expansion coefficient in the saturation-expansion-coefficient-calculating circuit 210.

First, in Step 401, the areas of respective color gamuts are calculated from coordinate values stored in the initial-color-gamut-apex-coordinate register 211 and user-target-color-gamut-coordinate register 212. Second, in Step 402, the saturation expansion coefficient (k) 209 is calculated based on the areas calculated in Step 401, using the following Expression 9.

$$k = \sqrt{\frac{\text{User target color gamut area}}{\text{Initial color gamut area}}} \quad \text{[Expression 9]}$$

According to the above embodiment, the following effects and advantages can be achieved.

(1) Although the color gamut of a liquid crystal display panel 114 cannot be enlarged from the gamut denoted by 301 in FIG. 3, pixels of low to middle saturations within the gamut denoted by 301 appear to have the color gamut 302, and thus the effect of enlarging the apparent color gamut to the one denoted by 302 can be achieved. In addition, as the expansion coefficient of saturation data is decided based on the initial and user target color gamut apex coordinates, and a saturation of the display data is expanded based on the coefficient thus decided, the degree of expanding the saturation can be controlled for each color gamut of the LC display panel 114.

(2) As a saturation can be adjusted for each color gamut in the panel because of the advantage and effect described in (1), the blue shift phenomenon which occurs for low gradation data in an LC display panel can be corrected.

Second Embodiment

Figure 5:
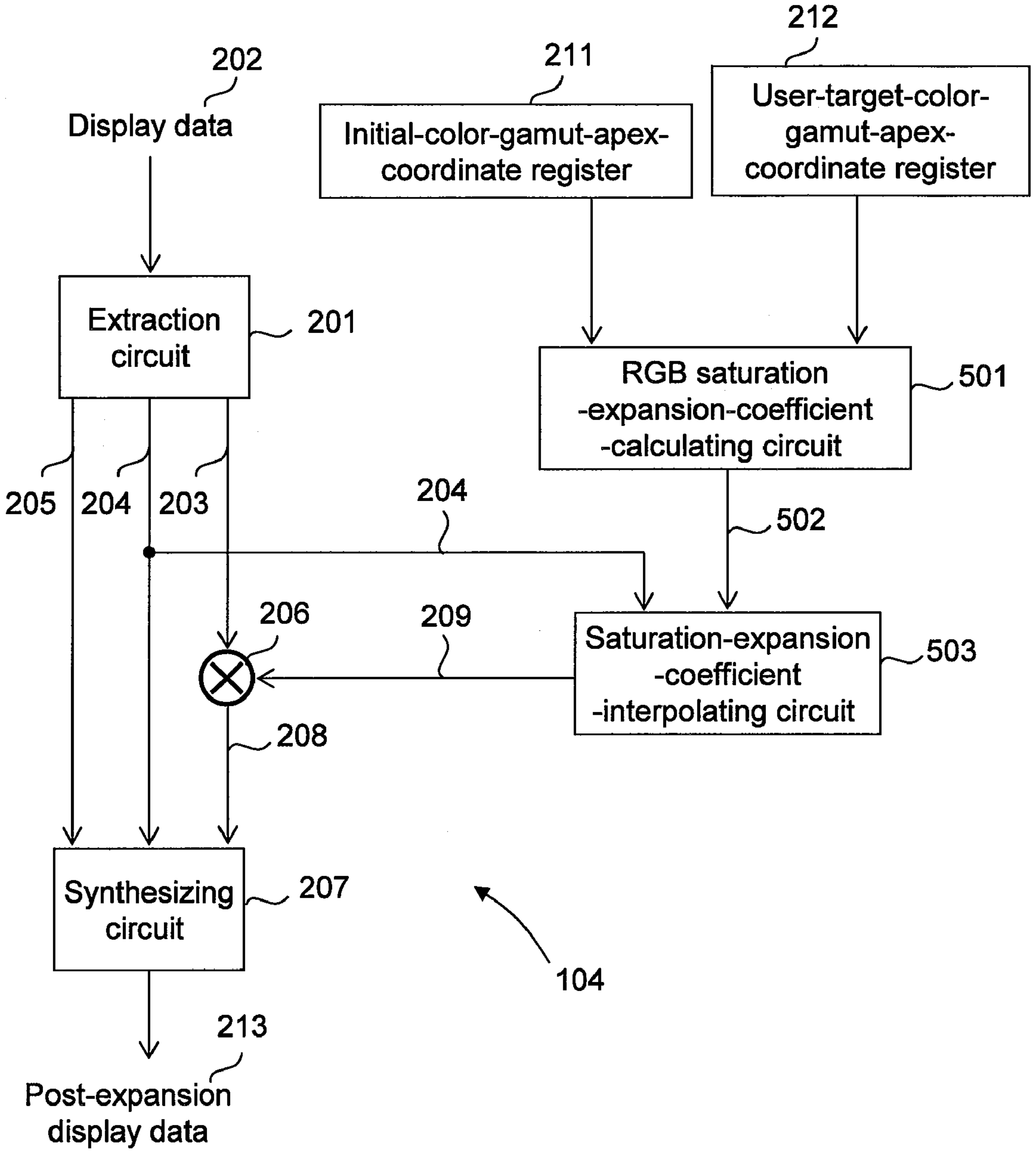
FIG. 5 is a block diagram showing another example of the configuration of the saturation-expanding unit in the LC driver.

FIG. 5 shows another example of the configuration of the saturation-expanding circuit 104.

The saturation-expanding circuit 104 shown in FIG. 5 largely differs from the circuit shown in FIG. 2 in that the saturation-expanding circuit has an RGB saturation-expansion-coefficient-calculating circuit 501 provided instead of the saturation-expansion-coefficient-calculating circuit 210, and a saturation-expansion-coefficient-interpolating circuit 503 provided for interpolating R, G and B saturation expansion coefficients (kR,kG,KB) 502 based on values of hue data (H) 204 extracted from the display data 202.

From values of the initial-color-gamut-apex-coordinate register 211 and user-target-color-gamut-apex-coordinate register 212, the RGB saturation-expansion-coefficient-calculating circuit 501 computes distances from a white coordinate to initial color gamut apex coordinates of R, G and B, and distances from the white coordinate to user target color gamut apex coordinates of R, G and B to determine a ratio of the distances of the initial and user target color gamut apex coordinates for each of R, G and B, and then calculates R, G and B saturation expansion coefficients (kR,KG,kB) 502 from the ratios thus determined. This is performed according to a method to be described later. The R, G and B saturation expansion coefficients 502 are results of calculation of the saturation expansion coefficient k with the conditions of R(H=0°), G(H=120°) and B(H=240°).

The saturation-expansion-interpolating circuit 503 linearly interpolates R, G and B saturation expansion coefficients 502 calculated by the RGB saturation-expansion-parameter-calculating circuit 501 for respective hues, calculates a saturation expansion coefficient k of each hue, and outputs the coefficients to a saturation-expansion-coefficient-calculating device 206. The method of the calculation is to be described later.

Figure 6:
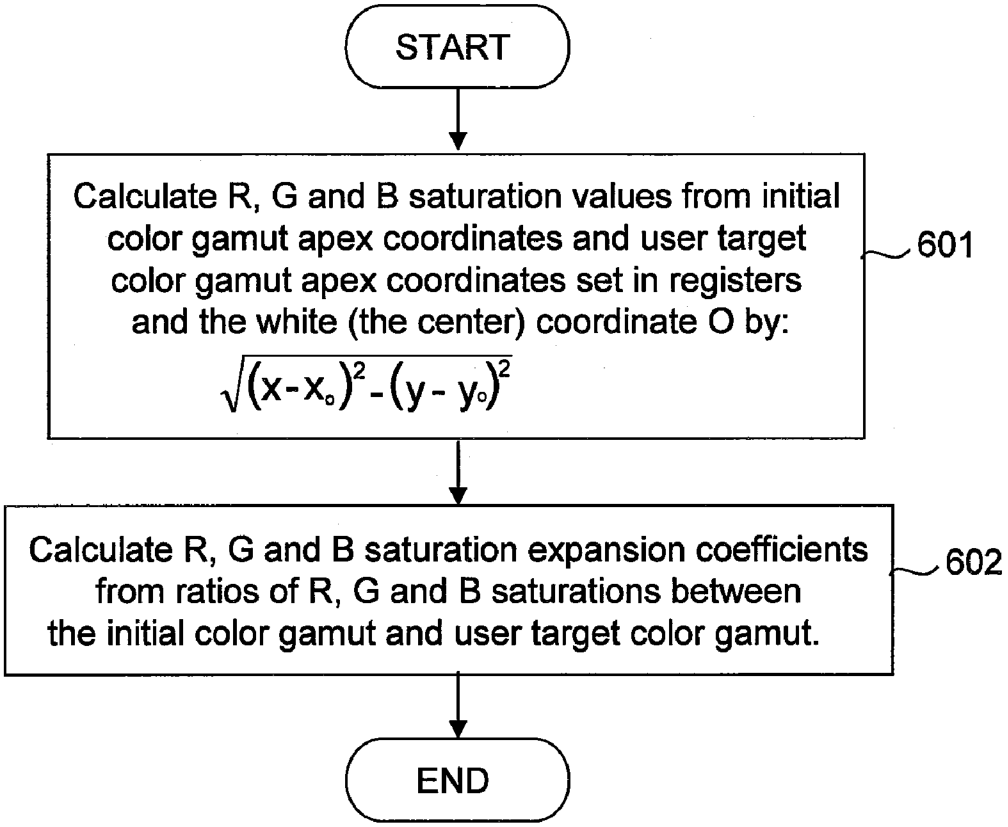
FIG. 6 is a flowchart of the calculation of the saturation expansion coefficient by the saturation-expanding unit shown in FIG. 5.

FIG. 6 shows a flow of the calculation of the R, G and B saturation expansion coefficients 502 in the RGB saturation-expansion-coefficient-calculating circuit 501.

First, in Step 601, saturation values of R, G and B are calculated from initial color gamut apex coordinate values stored in the initial-color-gamut-apex-coordinate register 211, and user target color gamut apex coordinate values stored in the user-target-color-gamut-apex-coordinate register 212 according to the Expression 10:

$$(R,G,B)=\sqrt{(x-x_o)^2-(y-y_o)^2} \quad \text{[Expression 10]}$$

where (x,y) represents x and y coordinate values of a chromatic coordinate with which it is desired to determine saturations, and $(x_0,y_0)$ represents x and y coordinate values of a white color in the color gamut.

Next, in Step 602, R, G and B saturation expansion coefficients (kR,KG,kB) 502 are calculated from ratios between saturation values of R, G and B in the initial color gamut and saturation values of R, G and B in the user target color gamut.

Figure 7:
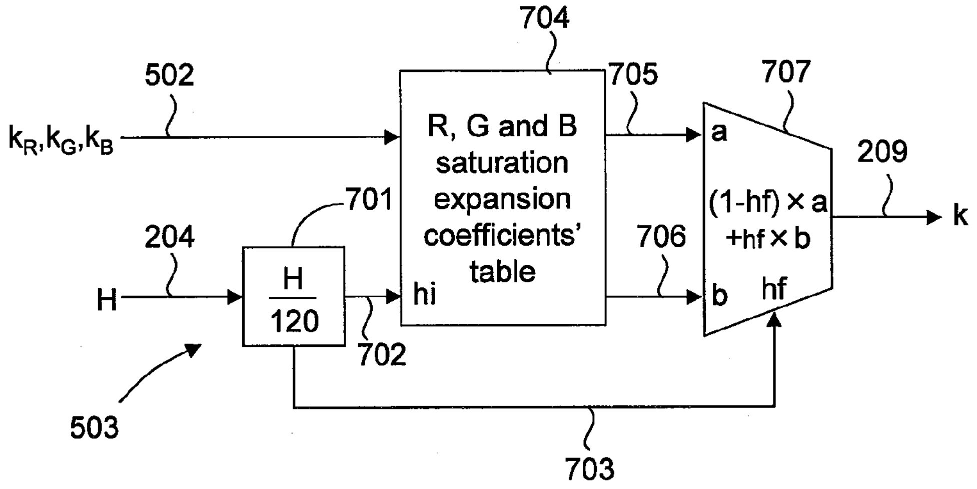
FIG. 7 is a block diagram showing an example of the configuration of the saturation-expansion-coefficient-interpolating circuit shown in FIG. 5.

FIG. 7 shows an example of the configuration of the saturation-expansion-coefficient-interpolating circuit 503.

The reference numeral 701 denotes a hue data divider; 702 denotes an interval judgment value (hi); 703 denotes a linear interpolation coefficient (hf); 704 denotes an R, G and B saturation expansion coefficients' table; 705 denotes a hue zero point a; 706 denotes a hue end point b; and 707 denotes a linear interpolation calculating device.

The hue data divider 701 accepts input of hue data (H) 204 from the extraction circuit 201. Then, the hue data divider divides the hue data (H) 204 by 120, outputs the integer part of the solution to the RGB saturation expansion table 704 as the interval judgment value (hi) 702, and outputs the decimal part to the linear interpolation calculating device 707 as the linear interpolation coefficient (hf) 703.

R, G and B saturation expansion coefficients 502 from the RGB saturation-expansion-coefficient-calculating circuit 501, and the interval judgment value (hi) 702 from the hue data divider 701 are input to the R, G and B saturation expansion coefficients' table 704. After that, the hue zero point (a) 705 and hue end point (b) 706 are decided as shown by the following Expression 11:

$$a=k_R, b=k_G (hi=0),$$

$$a=k_G, b=k_B (hi=1),$$

$$a=k_B, b=k_R (hi=2). \quad \text{[Expression 11]}$$

The results are output to the linear interpolation calculating device 707.

To the linear interpolation calculating device 707 is sent the linear interpolation coefficient (hf) 703 from the hue data divider 701, and the hue zero point (a) 705 and hue end point (b) 706 from the R, G and B saturation expansion coefficients' table 704. The linear interpolation calculating device performs linear interpolation on them according to the following Expression 12 thereby to calculate a saturation expansion coefficient (k) 209 for an appropriate hue data H:

$$k=(1-hf)\times a+hf\times b. \quad \text{[Expression 12]}$$

Then, the calculated saturation expansion coefficient is output to the saturation-expanding multiplier 206.

Figure 8:
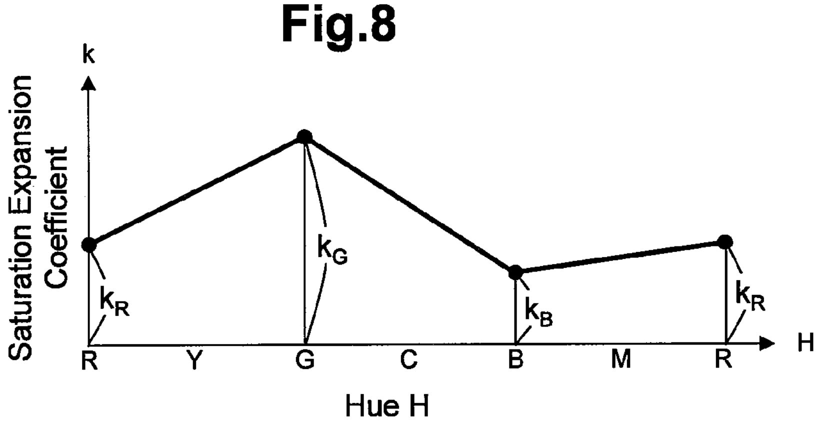
FIG. 8 is a diagram for explaining the interpolation of saturation expansion coefficients in the saturation-expansion-coefficient-interpolating circuit shown in FIG. 5.

FIG. 8 shows, in graph form, the results of calculation of saturation expansion coefficients (k) 209 for respective hues in case that the saturation-expansion-coefficient-interpolating circuit 503 performs the linear interpolation to calculate the saturation expansion coefficients.

Even with the initial color gamut distorted in form, the expansion as described above can straighten the apparent distorted form. In addition, as the expansion coefficient of saturation data is decided based on the initial and user target color gamut apex coordinates, and a saturation of the display data is expanded based on the coefficient thus decided, the degree of expanding the saturation can be controlled according to the properties of R, G and B colors. Further, according to this embodiment, the linear interpolation makes smooth change in the expansion coefficient k, and therefore good saturation expansion can be performed.

Figure 9:
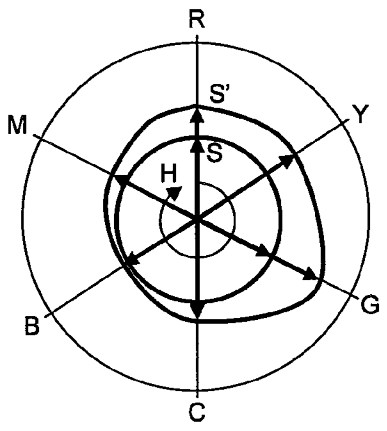
FIG. 9 is a diagram for explaining the relation between saturation data and post-expansion saturation data in the saturation-expansion-coefficient-interpolating circuit shown in FIG. 5.

FIG. 9 shows, in graph form, post-expansion saturation data (S') 208 for respective hues, which are output after multiplication of saturation data (S) 203 by the saturation expansion coefficient (k) 209 for each respective hue in the saturation-expanding multiplier 206 as shown in FIG. 8. Thus, use of the technique according to the invention can be shown distinctly by expanding display data having a certain constant saturation S in various hues H, measuring post-expansion display data, and determining post-expansion saturation data (S').

Third Embodiment

Figure 10:
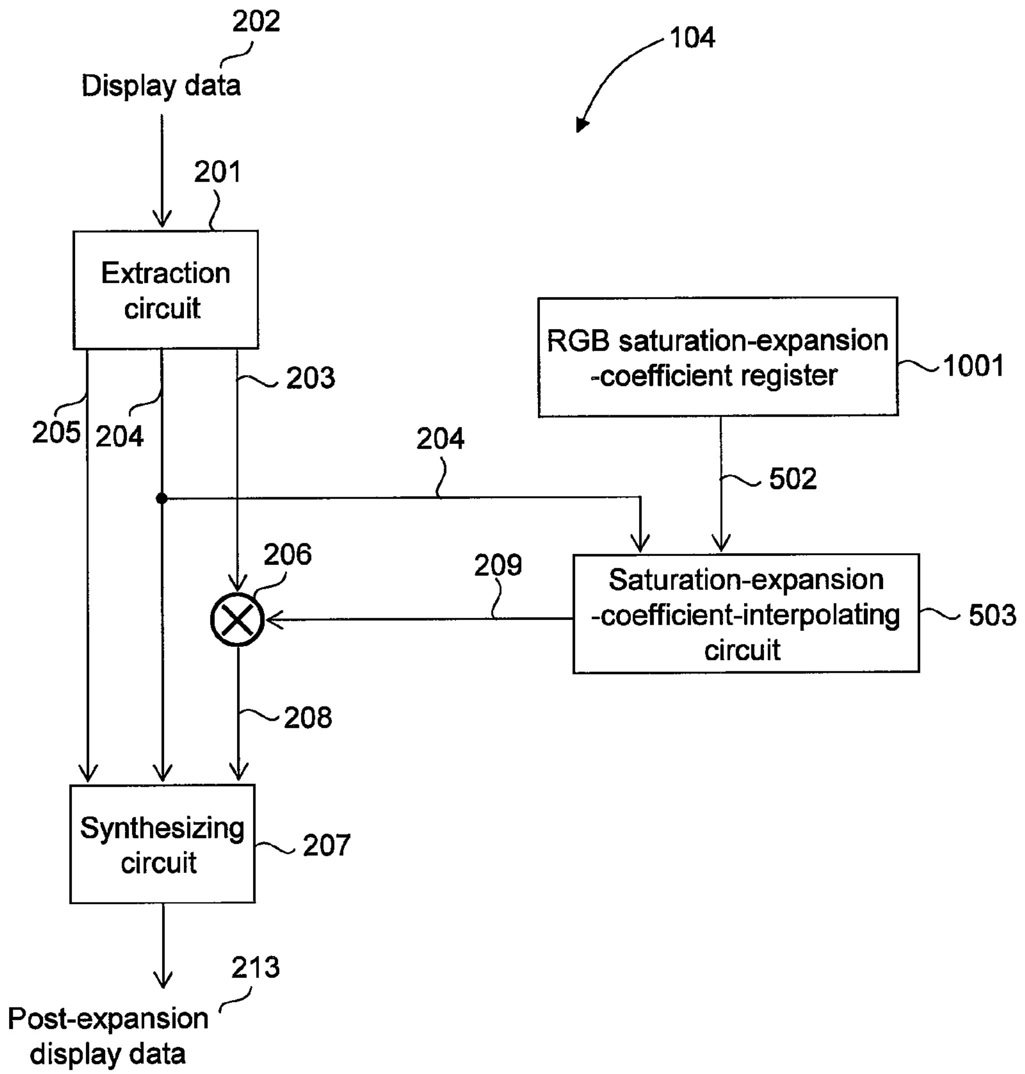
FIG. 10 is a block diagram showing another example of the configuration of the saturation-expanding unit in the LC driver.

FIG. 10 shows another example of the configuration of the saturation-expanding circuit 104.

The saturation-expanding circuit 104 shown in FIG. 10 largely differs from the circuit shown in FIG. 5 in that an RGB saturation-expansion register 1001 is provided instead of the initial-color-gamut-apex-coordinate register 211, the user-target-color-gamut-apex-coordinate register 212, and the RGB saturation-expansion-parameter-calculating circuit 501.

As values of the RGB saturation-expansion register 1001, e.g. R, G and B saturation expansion coefficients calculated according to the flowchart shown in FIG. 6 are set. The calculated R, G and B saturation expansion coefficients are arranged to be stored in a nonvolatile memory (not shown) so that they are transmitted to the RGB saturation-expansion-coefficient register 1001 through the system interface 102 each time the LC display device 100 is turned on. Consequently, the same effect as that achieved by the second embodiment can be attained by using the RGB saturation-expansion register 1001 instead of the initial-color-gamut-apex-coordinate register 211 and user-target-color-gamut-apex-coordinate register 212. Further, this embodiment eliminates the need for the initial-color-gamut-apex-coordinate register 211, user-target-color-gamut-apex-coordinate register 212 and RGB saturation-expansion-parameter-calculating circuit 501, and therefore the hardware configuration can be more simplified accordingly.

While the invention has been described above specifically, the invention is not so limited. It is needless to say that various changes and modifications may be made without departing from the subject matter thereof.

For example, according to the above-described embodiments, a combination of the initial-color-gamut-apex-coordinate register 211 and user-target-color-gamut-apex-coordinate register 212, or the RGB saturation-expansion-coefficient register 1001 is provided in the saturation-expanding circuit 104. However, apart of the control register 103 may be used instead of them.

In the above description, the invention made by the inventor has been described mainly focusing on the application to LC drivers, which is an applicable field forming the background. However, the invention is not so limited, and is applicable to various display drive circuits.

What is claimed is:

1. A display system comprising:
a liquid crystal display panel; and
a display drive circuit capable of driving the liquid crystal display panel according to display data entered thereinto,
wherein the display drive circuit comprises:
an initial-color-gamut-apex-coordinate-storing unit capable of storing initial color gamut apex coordinates;
a user-target-color-gamut-apex-coordinate-storing unit capable of storing user target color gamut apex coordinates;
a saturation-expansion-coefficient-deciding unit for deciding expansion coefficients of saturation data based on the initial and user target color gamut apex coordinates; and
an expansion unit for expanding saturations of the display data based on the saturation expansion coefficients.

2. The display system according to claim 1, wherein the saturation-expansion-coefficient-deciding unit computes the expansion coefficients based on an area ratio between a color gamut calculated from the initial color gamut apex coordinates and a color gamut calculated from the user target color gamut apex coordinates.

3. The display system according to claim 1, wherein the saturation-expansion-coefficient-deciding unit finds a square root of an area ratio between a color gamut calculated from the initial color gamut apex coordinates and a color gamut calculated from the user target color gamut apex coordinates thereby to compute the expansion coefficients.

4. The display system according to claim 1, wherein the display drive circuit further comprising an interface which enables information setting on the initial-color-gamut-apex-coordinate-storing unit and user-target-color-gamut-apex-coordinate-storing unit from outside of the display drive circuit.

5. A display system comprising:
a liquid crystal display panel; and
a display drive circuit capable of driving the liquid crystal display panel according to display data entered thereinto,
wherein the display drive circuit comprises:
an initial-color-gamut-apex-coordinate-storing unit capable of storing initial color gamut apex coordinates;
a user-target-color-gamut-apex-coordinate-storing unit capable of storing user target color gamut apex coordinates;
an RGB saturation-expansion-coefficient-deciding unit for deciding saturation expansion coefficients of R, G and B based on the initial and user target color gamut apex coordinates;
a saturation-expansion-coefficient-interpolating unit for performing interpolating calculation of the saturation expansion coefficients of R, G and B; and
an expansion unit for expanding saturations of the display data based on the saturation expansion coefficients subjected to interpolation by the saturation-expansion-coefficient-interpolating unit.

6. The display system according to claim 5, wherein the RGB saturation-expansion-coefficient-deciding unit finds distance values of the initial and user target color gamut apex coordinates of R, G and B from a white-color coordinate thereby to determine a ratio of the distance values of the initial and user target color gamut apex coordinates for each of R, G and B, and calculates a saturation expansion coefficient of each of R, G and B from the ratios.

7. The display system according to claim 6, wherein the saturation-expansion-coefficient-interpolating unit performs linear interpolation on the R, G and B saturation expansion coefficients based on hue data.

8. The display system according to claim 5, wherein the display drive circuit further comprising an interface which enables information setting on the initial-color-gamut-apex-coordinate-storing unit and user-target-color-gamut-apex-coordinate-storing unit from outside of the display drive circuit.

9. A display system comprising:
a liquid crystal display panel; and
a display drive circuit capable of driving the liquid crystal display panel according to display data entered thereinto,
wherein the display drive circuit comprises:
an RGB saturation-expansion-coefficient-storing unit capable of storing saturation expansion coefficients of R, G and B;
a saturation-expansion-coefficient-interpolating unit for performing interpolating calculation of the saturation expansion coefficients of R, G and B; and
an expansion unit for expanding saturations of the display data based on the saturation expansion coefficients subjected to interpolation by the saturation-expansion-coefficient-interpolating unit.

10. The display system according to claim 9, wherein the saturation-expansion-coefficient-interpolating unit performs linear interpolation on the R, G and B saturation expansion coefficients based on hue data.

11. The display system according to claim 9, wherein the display drive circuit further comprising an interface which enables information setting on the RGB saturation-expansion-coefficient-storing unit from outside of the display drive circuit.

* * * * *